(12) United States Patent
Lee et al.

(10) Patent No.: US 8,418,205 B2
(45) Date of Patent: Apr. 9, 2013

(54) METHOD AND APPARATUS FOR RECOMMENDING PERSONALIZED CONTENT

(75) Inventors: Kang-yong Lee, Daejeon-si (KR); Kee-seong Cho, Daejeon-si (KR); Bong-tae Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 476 days.

(21) Appl. No.: 12/603,703

(22) Filed: Oct. 22, 2009

(65) Prior Publication Data

US 2010/0125544 A1    May 20, 2010

(30) Foreign Application Priority Data

Nov. 18, 2008  (KR) .................. 10-2008-0114563

(51) Int. Cl.
*H04H 60/33* (2008.01)
*H04H 60/32* (2008.01)
*G06F 3/00* (2006.01)
*G06F 13/00* (2006.01)
*H04N 5/445* (2011.01)

(52) U.S. Cl. ............... 725/46; 725/9; 725/16; 725/37

(58) Field of Classification Search ............... 725/46
See application file for complete search history.

(56) References Cited

U.S. PATENT DOCUMENTS

| | | | |
|---|---|---|---|
| 8,006,270 B2 * | 8/2011 | Martini et al. ............... | 725/62 |
| 8,064,751 B2 * | 11/2011 | Klausberger et al. ......... | 386/292 |
| 2002/0083451 A1 * | 6/2002 | Gill et al. ................. | 725/46 |
| 2003/0061618 A1 | 3/2003 | Horiuchi et al. | |
| 2005/0076365 A1 | 4/2005 | Popov et al. | |
| 2005/0086692 A1 * | 4/2005 | Dudkiewicz et al. ......... | 725/46 |
| 2006/0075420 A1 * | 4/2006 | Ludvig et al. ............. | 725/9 |
| 2006/0225088 A1 | 10/2006 | Gutta | |
| 2006/0242661 A1 * | 10/2006 | Bodlaender et al. ......... | 725/9 |
| 2007/0169148 A1 | 7/2007 | Oddo et al. | |
| 2007/0180465 A1 * | 8/2007 | Ou et al. ................. | 725/34 |
| 2008/0022307 A1 | 1/2008 | Jeong et al. | |
| 2008/0250455 A1 * | 10/2008 | Fukuda et al. ............. | 725/46 |
| 2009/0113482 A1 * | 4/2009 | Kawada et al. ............ | 725/46 |

FOREIGN PATENT DOCUMENTS

| | | |
|---|---|---|
| KR | 1020030025837 A | 3/2003 |
| KR | 1020050023583 A | 3/2005 |
| KR | 1020060006919 A | 1/2006 |
| KR | 10-0720762 B1 | 5/2007 |
| KR | 1020080008040 A | 1/2008 |
| KR | 1020080058637 A | 6/2008 |

* cited by examiner

*Primary Examiner* — Justin Shepard
(74) *Attorney, Agent, or Firm* — Ladas & Parry LLP (57) ABSTRACT

Disclosed are a method and apparatus for recommending personalized content in an Internet Protocol Television (IPTV) service environment. The content recommending method includes: acquiring a user's viewing history information regarding broadcasting content; analyzing the user's preference for each content item based on the user's viewing history information; creating a list of recommended content items based on the analysis of the user's preference; and providing the list of recommended content items to the user's terminal. Accordingly, it is possible to recommend personalized content according to users' preference.

21 Claims, 4 Drawing Sheets

```
<UserID="sip:kanglee@etri.re.kr">
    <USAGE COUNTER>
      <GENRE>
            <HORROR>12</HORROR>
            <SHORT DRAMA>1</SHORT DRAMA>
            <SOCCER>2</SOCCER>
            <ACTION>7</ACTION>
      <GENRE>
      <ACTOR>
            <HONG KILDONG>5</HONG KILDONG>
            <LIM KUKJUNG><10</LIM KUKJUNG>
      </ACTOR>
      <PRODUCER>
            <MICHAEL>45</MICHAEL>
            <KANG HYUNSOO>6</KANG HYUNSOO>
      </PRODUCER>
      <KEYWORD>
            <HOPE>8</HOPE>
      </KEYWORD>
</UserID>
```

METHOD AND APPARATUS FOR RECOMMENDING PERSONALIZED CONTENT

CROSS-REFERENCE TO RELATED APPLICATION

This application claims the benefit under 35 U.S.C. §119(a) of Korean Patent Application No. 10-2008-114563, filed on Nov. 18, 2008, the disclosure of which is incorporated by reference in its entirety for all purposes.

BACKGROUND

1. Field

The following description relates to an Internet Protocol television (IPTV) service technology, and more particularly, to a technology for recommending personalized content based on user preference.

2. Description of the Related Art

An Internet Protocol Television (IPTV) service, which is a broadcast-communication integrated service, enables content providers to provide multi-channel broadcasting services, Video on Demand (VoD) services, digital video recorders (DVR) services, etc., as well as existing services such as IP-based interactive multimedia services and digital broadcasting services, via an IP-based communication network. Following the development of IPTV services, the types and amount of content that is provided has become more and more various and large in size.

In general, when using an IPTV service, a user selects and uses desired content by searching for a title, actor, producer, keyword, etc. of the content through an electronic program guide (EPG) with a terminal, for example, with a set-top box which supports IPTV services. However, if too many types of content are found or too much content is found, it will be difficult for the user to find desired content. This means that accuracy of searching is poor and accordingly the user's satisfaction with the IPTV service is lowered. In order to resolve this problem, studies into technologies for recognizing what content is demanded by users to perceive the users' preference and recommending personalized content to the users based on the users' preference are being developed.

Most known content recommending methods are based on content recommendation according to content preference information received and stored in advance from users. However, the conventional methods recommend content based on relatively correct preference information as users are required to themselves input information regarding their preference, but users have the inconvenience of having to update information regarding their preference whenever changes occur in preference. Also, the conventional methods do not reflect the importance between content description parameters in representing personal preference. In other words, the conventional methods have failed to perceive a content description parameter most influencing each user's preference among content description parameters, such as a content title, actor, producer, keyword, etc.

SUMMARY

The following description relates to a technology for evaluating users' preferences for content.

According to an exemplary aspect, there is provided a method of recommending personalized content to users in an Internet Protocol television (IPTV) service environment, including: acquiring a user's viewing history information of a user regarding broadcasting content; analyzing the user's preference for each content item based on the user's viewing history information; creating a list of recommended content items based on the analysis of the user's preference; and providing the list of recommended content items to the user's terminal.

The acquiring of the user's viewing history information includes determining whether the user's viewing history information meets a validity condition, and considering the user's viewing history information as valid information if the user's viewing history information meets the validity condition.

The analyzing of the user's preference for each content item includes: acquiring information on the lower items of each content description parameter of a content item corresponding to a content identifier included in the user's viewing history information; incrementing a usage counter of a corresponding lower item according to the acquired information on the lower items of each content description parameter, with respect to a user identifier included in the user's viewing history information; calculating degrees of the user's sensitivities to the respective lower items based on usage counters of the lower items; and obtaining a degree of the user's preference for each content item that is to be served, based on the calculated degrees of the user sensitivities to the lower items.

A degree of the user's sensitivity to each lower item is calculated by subtracting an average value of usage counters of all lower items belonging to a corresponding content description parameter from a usage counter of the lower item, squaring the value of the subtraction, and dividing the squared value by a square of a standard deviation of the usage counters of all lower items.

The degree of the user's preference for each content item that is to be served is calculated by summing all the user's sensitivities calculated for the respective lower items of the content item.

According to another exemplary aspect, there is provided an apparatus of recommending personalized content in an Internet Protocol television (IPTV) service environment, including: a viewing history profile storage in which viewing history information of each user regarding broadcasting content is stored; a content profile storage in which content description parameters for each content item and lower items of each content description parameter are stored; a viewing history information manager to acquire a user's viewing history information regarding broadcasting content and store the acquired user's viewing history information in the viewing history profile storage, and to acquire information on lower items of each content description parameter of a content item associated with the user's viewing history information from the content profile storage, increment a usage counter of a corresponding lower item with respect to a user identifier included in the user's viewing history information, and store the usage counter of the lower item in the viewing history profile storage; and a user sensitivity calculator to calculate degrees of the user's sensitivities to the lower items based on information stored in the viewing history profile storage; and a content recommendation unit to create a list of recommended content items based on the degrees of the user's sensitivities to the lower items and provide the list of recommended content items to the user's terminal.

The content recommending method recommends personalized broadcasting services in real time by evaluating a user's preference for broadcasting content based on the user's viewing history information regarding broadcasting content and on the user's sensitivities for content description parameters. Following the popularization of IPTV services, content for such IPTV services is becoming more and more varied and large in size. Following the development of IPTV services, the content recommending method proposes a technology for recommending personalized content by evaluating users' preference in order to provide satisfaction and convenience to users who use IPTV services.

Particularly, since the content recommending method evaluates a user's preference based on the user's viewing history information regarding broadcasting content, recent information on the user's preference for broadcasting content is reflected in real time to a system, which eliminates the inconvenience of having to directly update their preference at regular time periods. Also, since the content recommending method determines what item among various content description parameters, such as content title, actor, producer and keyword, most influences a user by evaluating the user's preference based on sensitivity to content, the content recommending method can recommend personalized content with a higher evaluation quality than existing recommendation methods. This sensitivity-based evaluation on the user's preference is a new trial which has never been introduced in conventional technologies. Through this method, user-demanded content can be easily and exactly provided to users, thereby minimizing difficulties in searching for desired content in vast amounts of content, which contributes to increasing the satisfaction of all users.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
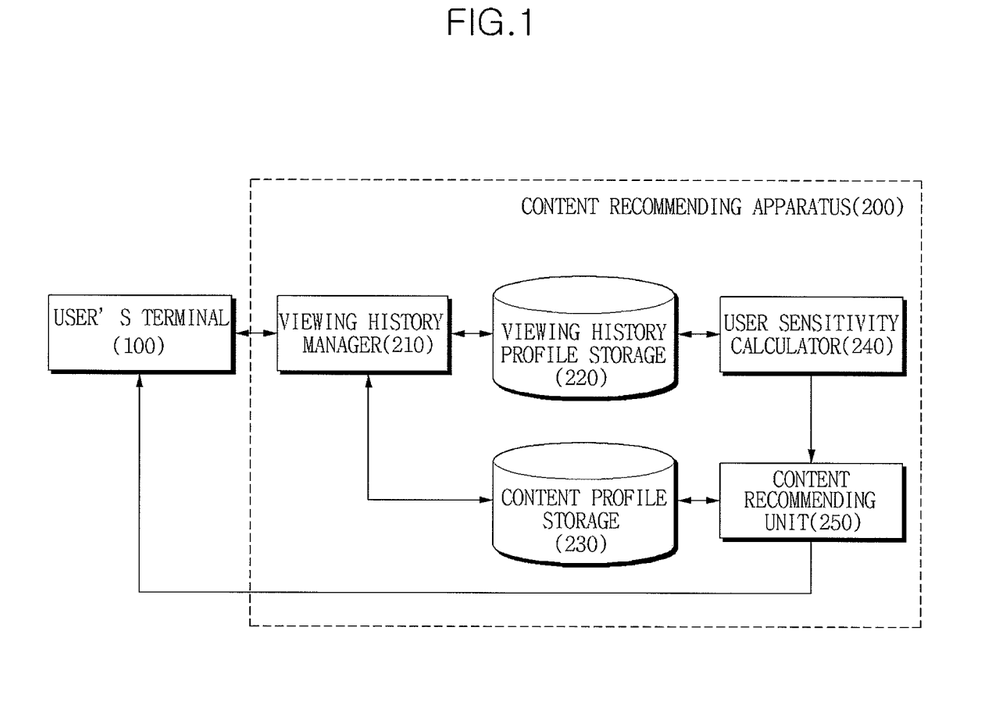
FIG. 1 is a block diagram illustrating a content recommending apparatus according to an exemplary embodiment.

FIG. 1 is a block diagram illustrating a content recommending apparatus 200 according to an exemplary embodiment.

In FIG. 1, a user terminal 100 is a device capable of using Internet Protocol (IP) services and may be a set-top box (STB). The user terminal 100 is a physical device which is separated from the content recommending apparatus 200, and may communicate with the content recommending apparatus 200 through an IP network. The user terminal 100 provides the user's viewing history information regarding broadcasting content to the content recommending apparatus 200. The user's viewing history information regarding broadcasting content will be described in more detail later.

The content recommending apparatus 200 includes a viewing history manager 210, a viewing history profile storage 220, a content profile storage 230, a user sensitivity calculator 240 and a content recommending unit 250. The viewing history manager 210 receives a user's viewing history information regarding broadcasting content from the user's terminal 100. Here, the user's viewing history information is created when the user initially accesses broadcasting content and is updated whenever the user uses the broadcasting content. For example, in the case of multi-channel broadcasting, whenever a user performs channel switching, the user terminal 100 creates the user's viewing history information regarding broadcasting content with respect to a newly converted channel, and transmits the user's viewing history information to the content recommending apparatus 200. Accordingly, the history manager 210 receives the user's viewing history information from the user terminal 100. As another example, in the case of video-on-demand (VoD), a user's viewing history information regarding video content demanded by the user may be created.

The user's viewing history information is composed of a user identifier, a content identifier and a timestamp. The user identifier, which is an ID by which the user is identified, may have various formats. According to an exemplary embodiment, the user identifier may be a Session Initiation Protocol-Uniform Resource Identifier (SIP-URI). Alternatively, the user identifier may be a Content Reference Identifier (CRID) which is defined according a standard developed by the TV-Anytime Forum to identify individual content. A CRID of content which the user begins to newly use may be included in the user's viewing history information. For example, a CRID of a new channel after channel switching or a CRID of VoD which the user begins to newly watch may be included in the user's viewing history information. A timestamp is information indicating a time at which the user terminal 100 creates new viewing history information regarding broadcasting content and transmits it to the viewing history manager 210. The Timestamp may be defined as follows.

YYYY-MM_DDThh:mm:ss, where YYYY represents "Year", MM represents "Month" and D represents "Day". Also, hh represents "Hours", mm represents "Minutes" and ss represents "Seconds". Accordingly, for example, "2008-09-01T12:34:12" indicates "12:34:12, 1 Sep. 2008".

Meanwhile, the user terminal 100 creates a user's viewing history information regarding broadcasting content and transmits it to the viewing history manager 210 whenever the user begins to use new broadcasting content. A method of transmitting the user's viewing history information to the viewing history manager 210 may be various. According to an exemplary embodiment, the user terminal 100 may transmit the user's viewing history information to the viewing history manager 210 using a SIP-based PUBLISH message.

The viewing history manager 210 receives users' viewing history information regarding broadcasting content from user terminals 100, processes the received information on the users' viewing histories, and stores the results of the processing in the viewing history profile storage 220. Through this operation, usage frequencies of broadcasting content that the users are currently using may be perceived. The viewing history manager 210, stores, instead of storing all of acquired viewing history information in the viewing history profile storage 220, only viewing history information meeting a validity condition in the viewing history profile storage 220. By applying a validity condition to selectively store viewing history information, viewing history information acquired when frequent channel switching occurs or viewing history information regarding broadcasting content viewed only for a short period of time may be ignored and accordingly more correct information on usage frequency may be collected. The validity condition may be set as follows.

$$\frac{T_1 - T_0}{T_{content}} \geq K \qquad (1)$$

In equation 1, $T_1$ represents a timestamp of currently acquired viewing history information, $T_0$ represents a timestamp of just previously acquired viewing history information and $T_{content}$ represents a length of just previously viewed content. For example, $T_{content}$ may be the running time of movie or the length of a program. A time difference between $T_1$ and $T_0$ is a total time for which the user viewed the corresponding broadcasting content. Accordingly, the viewing history manager 210 determines that the acquired viewing history information meets the validity condition when a ratio of the total viewed time of the corresponding content to the length of the content exceeds K. Here, K is set to 0.15. This means that the viewing history manager 210 determines that a user viewed content when the user viewed 15% or more of the entire amount of the content.

Meanwhile, the content profile unit 230 is a database in which content description parameters or content metadata for individual service content is stored. Generally, content description parameters are generated by a content provider when the corresponding content is created. The content description parameters provide details associated with the content, and may include genre, actor, producer, keyword, time of production, country of production, release information, price, length (running time) of content, etc. Hereinafter, for convenience of description, it is assumed that the content description parameters only include genre, actor, producer and keyword. However, the content description parameters are not limited to examples proposed herein.

The viewing history manager 210 extracts a CRID from the acquired viewing history information, and searches for information on the lower items of the respective content description parameters "genre, actor, producer and keyword" corresponding to the CRID in the content profile storage 230. For example, the lower items of a content description parameter "genre" may include horror, Monday and Tuesday dramas, love, action, soccer, kids, etc. The viewing history manager 210 reflects information regarding the respective content description parameters to the viewing history profile storage 220.

When reflecting information regarding the respective content description to parameters to the viewing history profile storage 220, if the viewing history manager 210 determines that a lower item of a content description parameter of a user's viewing history information, which has to be stored, exists in a viewing history profile of the user identified by the user identifier included in the user's viewing history information, the viewing history manager 210 increments a usage counter of the lower item by '1', and otherwise, the viewing history manager 210 sets the usage counter of the lower item to '1'.

Figure 2:
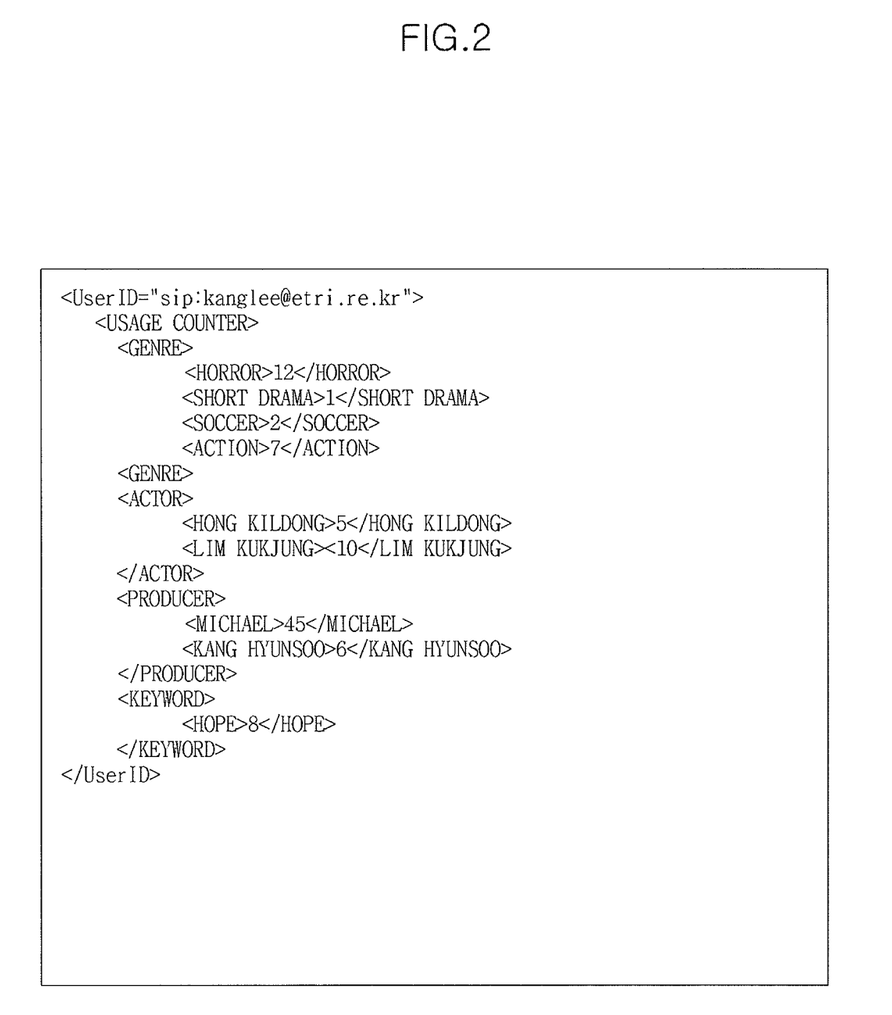
FIG. 2 shows an example of usage counters for each user that are stored in the user's viewing history profile regarding broadcasting content.

For example, when a user identifier of viewing history information that has to be stored is 'kanglee@etri.re.kr' and a genre of the viewing history information is 'horror', if the lower item 'horror' exists in the content description parameter 'genre' among viewing history information of 'kanglee@etri.re.kr' stored in the viewing history profile storage 220, the viewing history manager 210 increments a usage counter of the lower item 'horror' by '1'. Meanwhile, if no lower item 'horror' exists in the content description parameter 'genre', the viewing history manager 210 newly creates a lower item 'horror' and sets a usage counter of the 'horror' item to '1'. In the same way, the viewing history manager 210 stores information associated with the content description parameters 'actor', 'producer' and 'keyword' in the viewing history profile storage 220. An exemplary usage counter stored in an individual viewing history profile is shown in FIG. 2.

Meanwhile, the user sensitivity calculator 240 calculates sensitivity of each user using the viewing history information stored in the viewing history profile storage 220. According to an exemplary embodiment, sensitivity of each user is defined as a value representing how sensitive the user acts with respect to each of the content description parameters 'genre', 'actor', 'producer' and 'keyword'. For example, sensitivity to the 'horror' item of genre is a value representing how sensitive the user acts with respect to content whose genre is classified as 'horror'. Accordingly, the higher the sensitivity is, the more likely the user is to want to see the content, i.e. the user's preference level is higher to the corresponding item. Sensitivity to each lower item can be calculated by the following equation 2.

$$SG_i = \frac{(G_i - \mu_G)^2}{\sigma_G^2}, \qquad (2)$$

where $SG_i$ represents sensitivity to a lower item i and $G_i$ represents a usage counter of the lower item i. Also, $\mu_G$ represents an average of usage counters of all items belonging to 'genre', $\sigma_G$ represents a standard deviation of the usage counters of all items belonging to 'genre', and i represent a lower item of genre, such as 'horror', 'love', 'short drama', 'action', 'kid', 'animation', 'soccer', etc.

For example, it is assumed that usage counters for the lower items of the content description parameter 'genre' of the user 'kanglee@etri.re.kr' are as follows.

TABLE 1

| | |
|---|---|
| Horror | 10 |
| Monday and Tuesday Dramas | 20 |
| Love | 10 |
| Action | 5 |
| Animation | 20 |
| Soccer | 10 |
| Kids | 20 |

In this case, an average of the usage counters for the lower items of the 'genre' parameter is (10+20+10+5+20+10+20)/7, that is, about 13.57, and a standard deviation of the usage counters is 6.25. Accordingly, sensitivity of the user 'kanglee@etri.re.kr' to the 'horror' item can be calculated as follows.

$$SG_{horror}(\text{sensitivity to genre}) = \frac{(10-13.57)^2}{(6.26)^2} \approx 0.325 \quad (3)$$

The user's sensitivities to the other items can also be calculated in the same way. That is, the user's sensitivities to the 'actor', 'producer' and 'keyword' items can be calculated as follows.

$$SA_i(\text{sensitivity to actor}) = \frac{(A_i - \mu_A)^2}{\sigma_A^2} \quad (4)$$

$$SP_i(\text{sensitivity to producer}) = \frac{(P_i - \mu_P)^2}{\sigma_P^2} \quad (5)$$

$$SK_i(\text{sensitivity to keyword}) = \frac{(K_i - \mu_K)^2}{\sigma_K^2} \quad (6)$$

The user sensitivity calculator 240 calculates sensitivities of each user at regular time intervals. A time interval at which sensitivities are calculated may be set to a proper one of Day, Week and Month in consideration of a time required for calculation.

After sensitivity to each lower item is calculated by the user sensitivity calculator 240, the content recommending unit 250 performs a process of recommending broadcasting content. Recommendation of broadcasting content is performed for each user and carried out in a manner to create lists of recommended broadcasting content items and provide CRIDs of the lists to corresponding users.

First, the content recommending unit 250 obtains a sum of sensitivities of a user to lower items with respect to all serviceable content stored in the content profile storage 230. A sum of sensitivities of a user j to broadcasting content i can be expressed as in Equation 7.

$$\text{Content sensitivity}_{i,j} = SG_{i,j} + SA_{i,j} + SP_{i,j} + SK_{i,j} \quad (7)$$

Content sensitivity$_{i,j}$ is a sum of sensitivities of the user j to the content i, $SG_{i,j}$ is sensitivity of the user j to the 'genre' parameter of the content i and $SA_{i,j}$ is sensitivity of the user j to the 'actor' parameter of the content i. Also, $SP_{i,j}$ is sensitivity of the user j to the 'producer' parameter of the content i and $SK_{i,j}$ is sensitivity of the user j to the 'keyword' parameter of the content i.

For example, it is assumed that content description parameters stored in the content profile storage 230 are 'action' as genre, 'Michael' as actor, 'Hong Kildong' as producer, and 'War' as keyword. In this case, if sensitivity to the 'action' genre of a user j is 0.3, sensitivity to the actor 'Michael' is 0.1, sensitivity to the producer 'Hong Kildong' is 0.3, and sensitivity to the keyword 'War' is 0.2, a sum of sensitivities of the user j to content i is calculated to be 0.5+0.1+0.3+0.2=1.1. This sum of content sensitivities is defined as a degree of content preference of the user j to the content i.

The content recommending unit 250 calculates a sum of sensitivities to each of all content stored in the content profile storage 230, thereby obtaining degrees of content preference. Finally, the content recommending unit 250 creates a list of recommended content items arranged in the descending order of the degrees of content preference and provides a CRID of the list of recommended content to the user terminal 100. Accordingly, the user terminal 100 displays the list of recommended content items and allows the user to select desired content from the list. Here, the number of lists of recommended content items depends on the user's settings or system settings. 10 or more lists of recommended content items may be created.

Figure 3:
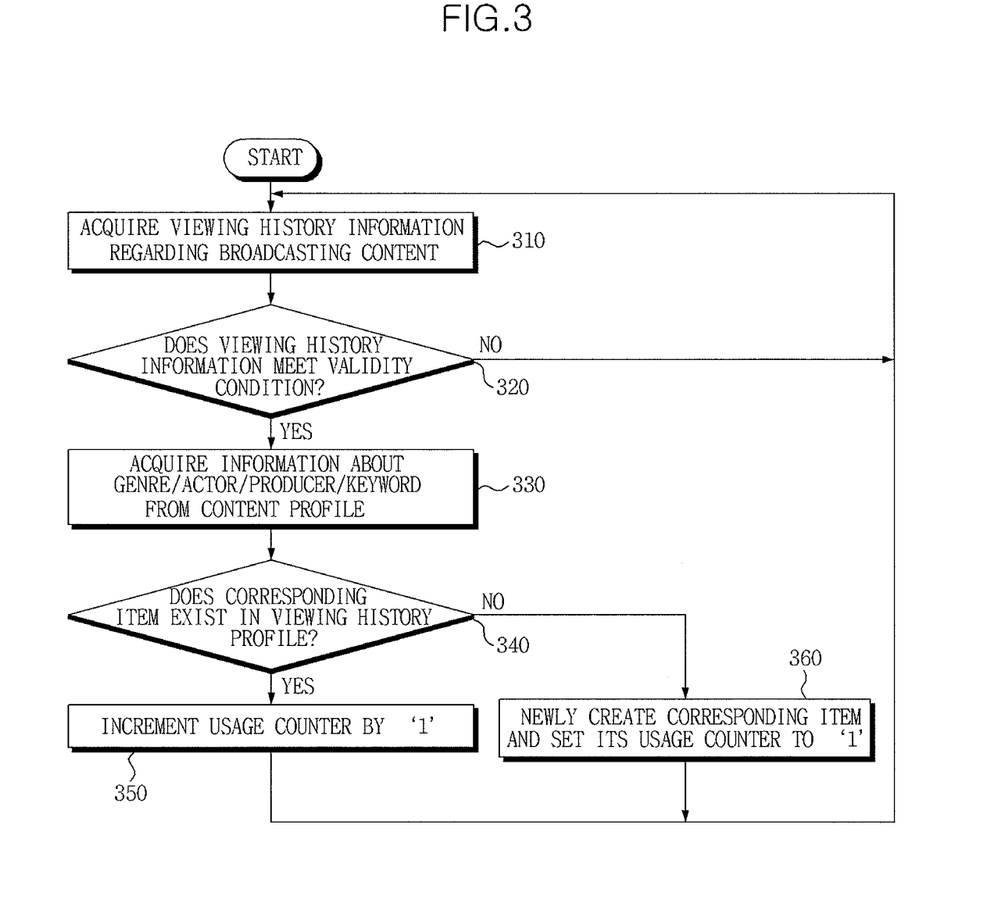
FIG. 3 is a flowchart illustrating a method of managing usage counters for the lower items of respective content description parameters of content that is used by a user, according to an exemplary embodiment.

FIG. 3 is a flowchart illustrating a method of managing usage counters for the lower items of respective description parameters of a content item that is used by a user, according to an exemplary embodiment.

Referring to FIGS. 1 and 3, the viewing history manager 210 acquires viewing history information regarding broadcasting content for each user (operation 310). This operation is performed by receiving viewing history information regarding broadcasting content from the user terminal 100. Then, the viewing history manager 210 determines whether the viewing history information meets a validity condition (operation 320). According to an exemplary embodiment, the validity condition may be the above-proposed equation 1. If the viewing history information meets the validity condition, the viewing history manager 210 stores the viewing history information regarding broadcasting content in the viewing history profile storage 220.

Then, the viewing history manager 210 extracts a CRID from the viewing history information, and searches for information regarding the lower items (that is, 'genre', 'actor', 'producer' and 'keyword') of content description parameters of a corresponding content item, in the content profile storage 230, using the CRID. If information regarding the lower items exist in the viewing history profile storage 220, the viewing history manager 210 increments a usage counter of each lower item by '1', and if any information regarding the lower items is found in the viewing history profile storage 220, the viewing history manager 210 newly creates the corresponding lower items and sets a usage counter of each lower item to '1' (operations 340, 350 and 360). Details for this operation have been described above, and the method illustrated in FIG. 3 is repeatedly performed.

Figure 4:
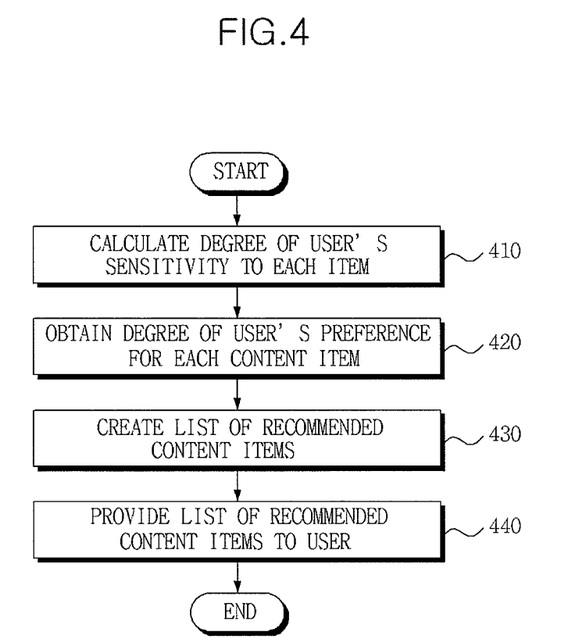
FIG. 4 is a flowchart illustrating a method of recommending content based on usage counters for the respective lower items, according to an exemplary embodiment.

FIG. 4 is a flowchart illustrating a method of recommending content based on usage counters for the respective lower items, according to an exemplary embodiment.

Referring to FIGS. 1 and 3, the user sensitivity calculator 240 calculates user sensitivities based on usage counters for lower items that are classified according to each user identifier and stored in the viewing history profile storage 220 (operation 410). As described above with equations 3 through 6, the user sensitivities are calculated for each content description parameter. Then, the content recommending unit 250 analyzes the user's preference for each of all content items stored in the content profile storage 230 (operation 420). Here, the user's preference is obtained by summing all the user sensitivities to the lower items, which are calculated in operation 410. After obtaining degrees of the user's preference for all content items, the content recommending unit 250 creates a limited number of lists of recommended content items, wherein each list is arranged in the descending order of the degrees of the user's preference (operation 430). Then, CRIDs of the lists of recommended content items are provided to the user terminal 100 (operation 440).

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method of recommending personalized content to users in an Internet Protocol television (IPTV) service environment, comprising:

acquiring a user's viewing history information meeting a validity condition of a user regarding broadcasting content;

analyzing the user's preference for each content item based on a degree of the user's sensitivity to a lower item of a content item belonging to the user's viewing history information;

creating a list of recommended content items based on the analysis of the user's preference; and providing the list of recommended content items to the user's terminal, wherein a degree of the user's sensitivity to a lower item of a content item is based upon an average value of usage counters of all lower items belonging to a corresponding content description parameter, a usage counter of the lower item, and a square of a standard deviation of the usage counters of all lower items.

2. The method of claim 1, wherein the user's viewing history information includes the user's identifier, a content identifier and a timestamp.

3. The method of claim 2, wherein the user's identifier is a Session Initiation Protocol-Uniform Resource Identifier (SIP-URI).

4. The method of claim 2, wherein the timestamp is a Content Reference Identifier (GRID) to identify individual content according to a standard developed by the TV-Anytime Forum.

5. The method of claim 2, wherein the timestamp includes information on a time at which the users viewing history information has been created.

6. The method of claim 2, wherein the acquiring of the user's viewing history information comprises subtracting a time indicated by a timestamp included in just previously acquired viewing history information of the user from a time indicated by the timestamp included in the user's viewing history information, and considering the user's viewing history information as valid information if a value obtained by dividing the resultant value of the subtraction by a whole length of content associated with the user's viewing history information exceeds a reference value.

7. The method of claim 1, wherein the user's viewing history information is acquired by using a session initiation protocol (SIP)-based presence service.

8. The method of claim 1, wherein the acquiring of the user's viewing history information comprises determining whether the user's viewing history information meets a validity condition, and considering the user's viewing history information as valid information if the user's viewing history information meets the validity condition.

9. The method of claim 1, wherein the analyzing of the user's preference for each content item comprises:

acquiring information on the lower items of each content description parameter of a content item corresponding to a content identifier included in the user's viewing history information;

incrementing the usage counter according to the acquired information on the lower items of each content description parameter, with respect to a user identifier included in the user's viewing history information; and obtaining a degree of the user's preference for each content item that is to be served, based on the user sensitivities to the lower items.

10. The method of claim 9, wherein the analyzing of the user's preference for each content item comprises:

acquiring information on the lower items of each context description parameter of a content item corresponding to a content identifier included in the user's viewing history information regarding broadcasting content which meets a validity condition;

incrementing the usage counter according to the acquired information on the lower items of each content description parameter, with respect to the user identifier included in the user's viewing history information; and obtaining a degree of the user's preference for each content item that is to be served, based on the user's sensitivities to the lower items.

11. The method of claim 10, wherein the content description parameter of the content item includes at least one of genre, actor and producer.

12. The method of claim 10, wherein a degree of the user's sensitivity to each lower item is calculated by subtracting the average value of usage counters of all lower items belonging to the corresponding content description parameter from the usage counter of the lower item, squaring the value of the subtraction, and dividing the squared value by a square of the standard deviation of the usage counters of all lower items.

13. The method of claim 12, wherein the degree of the user's preference for each content item that is to be served is calculated by summing all the user's sensitivities calculated for the respective lower items of the content item.

14. The method of claim 13, wherein the creating of the list of recommended content items comprises creating a list of recommended content items arranged in a descending order of degrees of the user's preference.

15. The method of claim 1, wherein the providing of the list of recommended content items to the user's terminal comprises a Content Reference Identifier (CRID) corresponding to the list of recommended content items to the user's terminal.

16. An apparatus of recommending personalized content in an Internet Protocol television (IPTV) service environment, comprising:

a viewing history profile storage in which viewing history information of each user regarding broadcasting content is stored;

a content profile storage in which content description parameters for each content item and lower items of each content description parameter are stored;

a viewing history information manager to acquire a user's viewing history information regarding broadcasting content meeting a validity condition and store the acquired user's viewing history information in the viewing history profile storage, and to acquire information on lower items of each content description parameter of a content item associated with the user's viewing history information from the content profile storage, increment a usage counter of a corresponding lower item with respect to a user identifier included in the user's viewing history information, and store the usage counter of the lower item in the viewing history profile storage; and a user sensitivity calculator to calculate degrees of the user's sensitivities to the lower items based on information stored in the viewing history profile storage, wherein a degree of the user's sensitivity to a lower item of a content item is based upon an average value of usage counters of all lower items belonging to a corresponding content description parameter, a usage counter of the lower item, and a square of a standard deviation of the usage counters of all lower items; and a content recommendation unit to create a list of recommended content items based on the degrees of the user's sensitivities to the lower items and provide the list of recommended content items to the user's terminal.

17. The apparatus of claim 16, wherein the viewing history information manager acquires the user's viewing history information from the user's terminal by using a Session Initiation Protocol (SIP) presence service.

18. The apparatus of claim 16, wherein the user's viewing history information includes the user's identifier, a content identifier and a timestamp.

19. The apparatus of claim 16, wherein the viewing history information manager stores the user's viewing history information in the viewing history profile storage when the user's viewing history information meets a validity condition.

20. The apparatus of claim 19, wherein the viewing history information manager determines whether the user's viewing history information meets the validity condition in consideration of a length of a content item corresponding to a content identifier and a timestamp included in the user's viewing history information.

21. A method of recommending personalized content to users in a television service environment, comprising:
  acquiring a user's viewing history information;
  analyzing the user's preference for each content item based on the user's viewing history information, including determining a degree of the user's sensitivity to a lower item of a content item based upon an average value of usage counters of all lower items belonging to a corresponding content description parameter, a usage counter of the lower item, and a square of a standard deviation of the usage counters of all lower items;
  creating a list of recommended content items based on the analysis of the user's preference; and
  providing the list of recommended content items to the user's terminal.

* * * * *